United States Patent
Baaske et al.

(10) Patent No.: US 11,090,141 B2
(45) Date of Patent: Aug. 17, 2021

(54) METHOD FOR PRODUCING A PROSTHESIS OR PARTIAL PROSTHESIS

(71) Applicant: Ivoclar Vivadent AG, Schaan (LI)

(72) Inventors: Thomas Baaske, Mols (CH); Robert Wolfgang Krybus, Oberschan (CH)

(73) Assignee: Ivoclar Vivadent AG, Schaan (LI)

( * ) Notice: Subject to any disclaimer, the term of this patent is extended or adjusted under 35 U.S.C. 154(b) by 274 days.

(21) Appl. No.: 16/324,343

(22) PCT Filed: Aug. 8, 2017

(86) PCT No.: PCT/EP2017/070002
§ 371 (c)(1),
(2) Date: Feb. 8, 2019

(87) PCT Pub. No.: WO2018/029164
PCT Pub. Date: Feb. 15, 2018

(65) Prior Publication Data
US 2019/0167392 A1    Jun. 6, 2019

(30) Foreign Application Priority Data

Aug. 10, 2016 (DE) ................ 10 2016 114 825.3
Aug. 2, 2017  (DE) ................ 10 2017 117 491.5

(51) Int. Cl.
A61C 13/00    (2006.01)
A61C 13/01    (2006.01)
A61C 13/087   (2006.01)
A61C 13/10    (2006.01)
A61C 13/36    (2006.01)

(52) U.S. Cl.
CPC ...... *A61C 13/0004* (2013.01); *A61C 13/0006* (2013.01); *A61C 13/0022* (2013.01);
(Continued)

(58) Field of Classification Search
CPC ............ A61C 13/0004; A61C 13/0006; A61C 13/0022; A61C 13/01; A61C 13/087;
(Continued)

(56) References Cited

U.S. PATENT DOCUMENTS 7,431,545 B2   10/2008  Suttor et al.
9,615,902 B2 *  4/2017  Miguel ................ B23B 31/307
(Continued)

FOREIGN PATENT DOCUMENTS

DE   102009026159 A1   1/2011
DE   102014102344 A1   8/2015
(Continued)

*Primary Examiner* — Jermie E Cozart
(74) *Attorney, Agent, or Firm* — Ann K. Knab; Thad McMurray

(57) ABSTRACT

A method for producing a prosthesis or partial prosthesis based on digital data, using multiple teeth present in a dental arch (14) and a prosthesis base to be produced. The prosthesis base is rough-milled by a milling tool, i.e. is milled in a first step, and the prosthesis base present as a semi-finished product, in particular in regions of the prosthesis base on which the teeth and the prosthesis base abut against each another and/or are to be bonded to each other, is partially milled, i.e. is milled in a second step, by a different milling tool, thereby being brought to a target height which corresponds to the desired bonding gap between the prosthesis base and the tooth or dental arch (14).

19 Claims, 4 Drawing Sheets

(52) U.S. Cl.
CPC ............ *A61C 13/01* (2013.01); *A61C 13/087* (2013.01); *A61C 13/1003* (2013.01); *A61C 13/1013* (2013.01); *A61C 13/1016* (2013.01); *B23C 2215/00* (2013.01); *B23C 2220/605* (2013.01)

(58) Field of Classification Search
CPC ............ A61C 13/1003; A61C 13/1013; A61C 13/1016; B23C 2220/605; B23C 2215/00; Y10T 29/49567
See application file for complete search history.

(56) References Cited

U.S. PATENT DOCUMENTS

| | | | |
|---|---|---|---|
| 9,655,698 B2 | 5/2017 | Nakamura et al. | |
| 9,693,840 B2 | 7/2017 | Hufschmied | |
| 9,737,465 B2 | 8/2017 | Fecher et al. | |
| 10,842,600 B2 | 11/2020 | Baaske et al. | |
| 2002/0102521 A1* | 8/2002 | Iiyama | A61C 13/0004 433/215 |
| 2013/0101962 A1* | 4/2013 | Howe | A61C 13/0022 433/191 |
| 2014/0189991 A1* | 7/2014 | Duncan | B23Q 1/4871 29/56.5 |
| 2016/0256247 A1 | 9/2016 | Watzke et al. | |

FOREIGN PATENT DOCUMENTS

| | | |
|---|---|---|
| JP | 2010220714 A | 10/2010 |
| JP | 2015-136520 A | 7/2015 |
| WO | 2011/066895 A1 | 6/2011 |
| WO | 2016/005287 A1 | 1/2016 |

\* cited by examiner

METHOD FOR PRODUCING A PROSTHESIS OR PARTIAL PROSTHESIS

CROSS-REFERENCE TO RELATED APPLICATIONS

This application is a National Stage application of International patent application PCT/EP2017/070002 filed on Aug. 8, 2017, which claims priority to German patent application No. 102016114825.3 filed on Aug. 10, 2016, and which also claims priority to German patent application No. 102017117491.5 filed on Aug. 2, 2017, all the disclosures of which are incorporated herein by reference in their entirety.

FIELD OF THE INVENTION

The invention relates to a process for the production of a prosthesis or partial prosthesis.

BACKGROUND OF THE INVENTION

The manufacture of prostheses today is comparatively expensive and costly, even if computer assistance is being used.

The following procedure is often used:

To acquire the patient's oral cavity, either an impression is taken or an intraoral scan is performed. For example, this acquires the edentulous jaw to be fitted with the prosthesis and, for example, the edentulous jaw including the patient's teeth.

Based on the oral situation, a target shape of the prosthesis is now provided by CAD, including the prosthesis teeth, which must of course match the respective antagonists.

It is particularly favorable if gnatological aspects are also taken into account, for example the chewing movement and the associated condylar joint shaping.

This can be checked and corrected, if necessary, by providing an appropriate model and using it in an articulator.

The actual manufacture of the prosthesis subsequently takes place such that, based on the data obtained, a flesh-colored prosthesis base is produced, for example from polymethyl methacrylate (PMMA), with tooth cavities. The teeth to be used are inserted and glued into the tooth cavities. They can be milled teeth of a set of teeth. Occlusal defects must then be removed by milling or typically by grinding.

Alternatively, it is also possible to make use of individually manufactured teeth, such as those made of ceramics. Herein, a prefabricated blank made of lithium meta-silicate is given the desired shape, for example by milling. The tooth produced in this way is then sintered to lithium disilicate, taking advantage of the fact that practically no shrinkage will occur.

Alternatively, plastic teeth can also be used, which are manufactured either additively or subtractively, for example by milling.

All the methods used have in common that a high-quality prosthesis without occlusal defects requires a comparatively sophisticated manufacturing process that also takes a comparatively long time.

As an example, reference is made to the solution according to DE 10 2009 026 159 A1, according to which milling cutters with different diameters are used for coarse milling and fine milling. According to the teachings of this specification, rough, fine and coarse machining is to be carried out, as is pre-finishing. This procedure as well is costly and time-consuming.

SUMMARY OF THE INVENTION

On the other hand, the object of the invention is to provide a procedure according to the attached claims, by which a prosthesis or partial prosthesis can be manufactured quickly and with high quality, wherein especially the manual work to be performed by the operator is also intended to be reduced.

This object is achieved by the attached claims. Advantageous embodiments will arise from the subclaims.

According to the invention, it is provided for the prosthesis base to be rapidly rough-milled in a first step. Based on a blank disc of, for example, 98.5 mm to 100 mm in diameter, the rough shape of the prosthesis base is thus shaped within 10 min to 40 min, especially about 30 min, into a shape which already closely resembles the desired subsequent prosthesis base, but not leaving less material in place than required for the subsequent prosthesis base.

This is followed by finish-milling, and this only in those areas where the prosthesis base subsequently will come into contact with the teeth or prosthesis arch in accordance with claim 2. These areas are designed as cavities or as a U-shaped recess. If necessary, the basic shape of the cavities can be prepared by rough-milling.

Finish-milling is carried out at a target height corresponding to the CAD-specified parting line between the dental arch and the prosthesis base. The strength of the adhesive joint is taken into account in a manner known per se.

Following pre-machining on the one hand, and, on the other hand, as only small regions of the prosthesis base, especially the cavity areas, which for example only constitute between 5% and 30% of the total surface of the prosthesis base, the corresponding finish-milling result can rapidly be achieved.

If the rough geometry of the prosthesis base is to be rough-milled to speed up the process, the milled area comprises about 30%-55% of the total surface area.

It is particularly advantageous if there is a great difference between the milling tools used for finish-milling and those used for rough-milling. The plunging depth of the roughing cutter preferred according to the invention can, for example, be between 0.7 mm and 2.5 mm.

Contrary to this, the plunging depth of a finishing cutter, as it is to be used according to the invention, can be between 0.1 mm and 0.5 mm. Especially when—as it is preferred according to the invention-plastics such as PMMA, which is kept as being gingival-colored, are milled, care is taken, according to the invention, for the milling working temperature to be low. For example, rough-milling can be performed using a preferably single-edged cutter having a diameter of 0.8 to 5 mm at 20000 rpm to 25000 rpm, while finish-milling can be performed using a cutter having a diameter of 0.5 mm to 2.5 mm at a speed between 25000 rpm and 30000 rpm. Fissures, e.g. in the occlusal surface of molars, can be created with fine finishing cutters having a diameter of 0.5 to 0.7 mm.

Especially, serious cost and time reductions in manufacturing a prosthesis or partial prosthesis can be achieved by realizing a prosthesis dental arch from a tooth-colored blank according to the invention. The blank can, for example, also be in the form of a disc, wherein two or even more dental arches can be accommodated on a blank disc having a diameter of 100 mm. Alternatively, it can also be milled from an essentially U-shaped blank. The blank is first milled by rough-milling-preferably with the same roughing cutter as mentioned above—and brought into the essential U-shape.

An essentially U-shaped dental arch can be made from a blank for subsequent preparation of teeth from a tooth-colored material, especially PMMA with fillers. Production can be carried out in any suitable manner, e.g. by milling or by means of a pressing process.

Instead, the semi-finished dental arch product can also be produced by injection molding or compression molding or any other molding process. It is also possible to prefabricate the dental arch as a quarter product having additional oversize by injection molding and following this, finish the semi-finished product by pre-milling such that having a nominal oversize in the desired dimension according to the patient's dental arch, e.g. "small", "medium" and "large".

The semi-finished product is preferably fabricated by leaving the holding bars and realizing oversizes of the teeth of the prosthesis, in particular by rough-milling. The basal area of the dental arch, i.e. the basal surface and the adjoining surfaces, are prepared for being received in a prosthesis base. For this purpose, the basal area is brought into an essentially trapezoidal cross-section.

The dental arch blank (tooth-colored blank) may exhibit a gingival-incisal or gigival-oclusal shade gradient, especially from dark to light. The height of the dental arch in the blank will preferably be determined by CAD/CAM, according to the user's choice, so that the actual color range and/or brightness range of the dental arch will be determined.

The dental arch and/or the dental arch blank can also be multi-part, e.g. three-part, including 2 molar dental arches and one anterior partial dental arch.

In this case it is sufficient if only the anterior arch has a gradient.

However, the tooth shape is not yet provided. Only the basal surface of the teeth of the blank is roughened and smoothed to have the desired shape by roughing and finish-milling, and eventually any adjacent areas of the dental arch or teeth. These areas are preferentially formed as inclined surfaces which extend at an angle of 100° to 170° in relation to the basal surface, converging towards the basal surface.

The angle configuration, the course and other geometric features of this gingival area of the dental arch are exactly adapted to the tooth cavity of the prosthesis base, leaving an adhesive gap of 0.150 mm, for example, or an appropriate value between 0.08 mm and 0.22 mm.

In turn, only a small area of the entire outer surface of the dental arch, for example 30% to 50%, is subjected to finish-milling, so that the CNC milling machine to be used does not take long to produce the desired precise contact surfaces. This is especially true as rough-milling was also used herein for pre-milling.

After the dental arch and the dental cavity of the prosthesis base have been created, the surfaces facing each other-either one of these or both—are provided with a suitable adhesive. Prior to this, the surface area is further increased, e.g. by sandblasting or by milling specific structures such as grooves, elevations, depressions and/or geometric patterns onto the basal side of the dental arch or the tooth cavities of the prosthesis base.

The adhesive can also be applied while the prosthesis base is clamped into the CNC milling machine by opening the door leading to the milling chamber and having the operator perform the appropriate procedure.

Alternatively, the prosthesis base or the dental arch can be removed and processed accordingly.

After both parts have been prepared, they are substantially provided with adhesive in those regions that are subsequently to be adhered to each other. For this purpose, an adhesive joint of e.g. 0.12 mm is provided by CAD design.

For example, the parts are then fixed in place by a transfer matrix until the adhesive has cured.

While specific clamps can also be used to hold the combination of dental arch and prosthesis base in place during curing of the adhesive, it is also possible to return the prosthesis base into the milling machine for clamping or to leave it clamped in the machine and, after insertion of the dental arch, briefly press it against a counterpressure surface so that a contact pressure will also be applied during curing.

The pressure causes the adhesive to ooze out of the adhesive joint in the transition area between exposed areas and contact areas of the dental arch, i.e. the so-called gingival margin. The transition area between the dental arch and the prosthesis base is free of oversize. Thus, the gingival margin is free, but is covered by excess of adhesive.

The adhesive gap is completely filled with adhesive. The adhesive oozes out of the gap, providing excess of adhesive or joining mass. This will be removed during the final finishing step.

Following curing, the prosthesis base, together with the teeth inserted or—preferably—the dental arch, is returned into the workpiece holder of the milling machine or remains clamped therein.

The milling machine is preferably designed such that an automatic tool exchange of the different roughing and finishing cutters is possible.

At this point, the prosthesis base still is preferably connected to the remaining blank disc via holding bars. Alternatively, it is also possible to hold the prosthesis base itself in place using appropriately designed workpiece holders.

Optionally, a rough-milling step will then be performed with a rough-milling tool, which may be slightly finer, with plunging depths being between 0.7 mm and 2.5 mm. This is for preparing the finishing operation so that the time for finishing will further be reduced.

Any adhesive beads caused by oozing adhesive are automatically removed in the final milling step.

In this last step, which can also be carried out while omitting the rough-milling step mentioned above, both the tooth area and the prosthesis base area are simply milled to the desired target shape. This can also be done in an overnight process, if required by the process flow, as no user intervention is required during this last step.

If inaccuracies are caused by the gluing step, e.g. with regard to the height, they will automatically be corrected using the final milling step. This can be done automatically: Based on the CAD data, a target shape for the occlusal surface and the other exposed tooth surfaces is stored in the CAM software.

If the dental arch or partial dental arch is glued in "obliquely", i.e. if there is a gluing error, finish-milling will still be performed according to the target, so that occlusal defects will be avoided per se.

The prosthesis is then polished, e.g. for 10 minutes.

The finished prosthesis is then available and can be removed from the CNC milling machine.

The material used for both the dental arch and the prosthesis base is preferably adapted to the requirements. For example, a somewhat harder PMMA plastic material can be used for the dental arch, or a material consisting of a combination of PMMA and inorganic or organic fillers the strength/hardness of which is greater than that of the prosthesis base material. The filler content of the dental arch material is 10 to 30% by weight, preferably about 20%.

While milling cutters having a larger diameter than roughing cutters and having a smaller diameter than finishing cutters are preferred for rough-milling, this is not instantly required; it is also possible that, in a particular case, the diameter of a finishing cutter may exceed that of a roughing cutter.

During the bonding process, it is also possible to keep the prosthesis base and the dental arch separate from each other at a specified distance, which corresponds to the desired optimum thickness of the adhesive joint. A kind of fine-tuning can subsequently be provided by adjusting the height of the dental arch in relation to the prosthesis base and, if necessary, also the lateral position and the angular position as required. In this embodiment of the invention, the adhesive joint represents a means of avoiding or reducing any occlusal defects. This also eliminates the need to check the fit, e.g. in the articulator.

It is to be understood that when inserting and re-inserting the workpiece, i.e. the dental arch or prosthesis base, irrespective of the respective condition of machining a blank or a semi-finished product, marks can be used in a manner known per se which ensure alignment of the exact position of the workpiece to the clamping device in the milling machine.

Such marks are preferably applied to areas which are not milled off or which are not milled off before the final finishing step.

Rough-milling is preferred to be extremely rough, i.e. only approximating the target shape, wherein the oversize may vary, both within the prosthesis base or the dental arch and also from specimen to specimen. The range of variation may be between 0.2 mm and 1.5 mm.

By using larger roughing cutters and using a significant feed rate slightly below the material's load limit, rough-milling time will drastically be reduced, for example one third of the finish-milling time.

The workflow in the dental laboratory or dentist office is significantly improved by the short roughing time, whereupon interference by the operator is required, representing significant advantage of the invention.

In a manner known per se, the CAM software can control both rough-milling and finish-milling. It is also possible to monitor the material temperature by using an appropriately equipped milling machine comprising a temperature sensor, to keep the load limit of the material. Tool replacement as well as workpiece change is also carried out automatically in a manner known per se, so that only the gluing procedure remains as an operation requiring at least partial user intervention.

It is particularly advantageous if both the prosthesis base and the dental arch remain connected to the rest of the blank via holding bars. This makes it possible to avoid a specialty holder for the semi-finished parts. The holding bars will be removed not before the last possible point of time, e.g. for the dental arch, when gluing it into the tooth cavity of the prosthesis base. On the other hand, for the prosthesis base, the holding bars may not be removed before completion of the final finish-milling step.

The shape of the interconnected cavities for the dental arch can be adapted to the requirements in a wide range. Thus, the canal or tooth cavity, as it may also be referred to, can be flatter in the molar region and deeper in the anterior region. This may result in corresponding change of the angle of the inclined surfaces, so that stronger inclined surfaces are used in the anterior region than in the molar region.

The depth of the tooth cavity can as well be adapted to the requirements in a wide range, as can the width. Herein, too, there may be a change in the course of the dental arch.

In an advantageous embodiment, it is provided for the overall rough-milling time to be less than half and especially preferred less than one third of the overall finish-milling time and for the finish-milling to be controlled by CAM software, especially overnight.

In another advantageous embodiment, it is provided for the tooth arch blanks (10) and prosthesis base blanks, to be inserted into the workpiece holder, especially individually in disc form, in the same milling machine, and, if necessary, for the tool to be automatically switched from a roughing cutter to a finishing cutter by tool replacement.

In another advantageous embodiment it is provided, following preparation of the basal surfaces (20) and the surrounding regions of the dental arches or of the partial dental arches by finish-milling and preparation of the cavities in the prosthesis base for receiving the dental arches or partial dental arches, for adhesive to be applied to one or both of the opposite surfaces, in particular by machine, and, particularly preferably while at least one of the parts to be bonded be kept clamped in the milling machine.

In another advantageous embodiment, it is provided, following adhesive application, for the parts to be bonded to each another to be held in a manner known per se while curing, in particular in the milling machine, the workpiece holder of the milling machine pressing the prosthesis base and the tooth arch (14) bonded therein against a counter-pressure region, thus applying the adhesive holding force.

In another advantageous embodiment, it is provided for at least two dental arches (14) of tooth-colored material to be accommodated on a blank (10) or, if appropriate, a plurality of partial dental arches to be accommodated on a blank (10).

In another advantageous embodiment, it is provided for the tooth arch blank (tooth-colored blank) to have a gingival-incisal or gingival-occlusal shade gradient, in particular, from bright to dark, and for the height level of the dental arch in the dental arch blank determined by CAD/CAM to determine the color range and/or brightness range of the dental arch according to the user's choice.

In another advantageous embodiment, it is provided for the upper jaw dental arches to be pre-fabricated rather crown-shaped compared to the lower jaw dental arches, whereas lower jaw dental arches are slimmer.

The process of the invention results in considerable milling time savings and also reduction in tool wear.

The material used can be reduced by using pre-formed dental arches in different sizes. In addition, holding bars/holders for CAM devices can be provided on the pre-formed dental arches to replace the required cost-intensive disc holders.

It is particularly advantageous for the milling time to be considerably reduced by the milling strategy, i.e. rough-milling of essential parts, finish-milling of the transition areas, joining, subsequently, in turn, eventual rough-milling, then final finish milling.

According to the invention, it is particularly advantageous for the dental arch in the prosthesis base to be allowed to be glued much easier compared to gluing individual teeth into the prosthesis base. Adhesive strength is also promoted by the large-area support.

BRIEF DESCRIPTION OF THE DRAWING

Further details, advantages and features can be found in the following description of several example embodiments, by making reference to the drawings, wherein.

DETAILED DESCRIPTION

Figure 1:
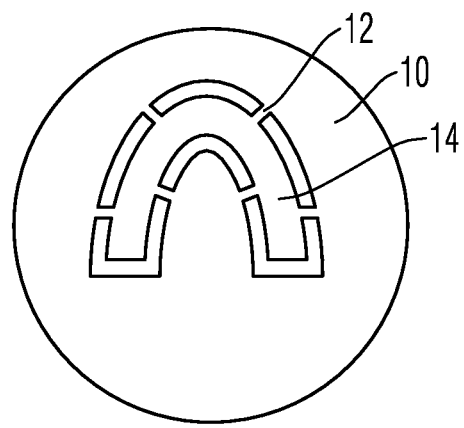
FIG. 1 is a schematic view of a dental arch blank comprising a dental arch already partially milled out.

FIG. 1 shows a schematic representation of a tooth arch blank disk 10. The tooth arch blank disk, for example, has a diameter of 98.5 mm and a height of 20 mm, wherein it is to be understood that these dimensions can be adapted to the requirements in a wide range. The height of the disc should, in any case, cover the maximum height of the teeth to be created or the dental arch to be created, i.e. including the basal area.

As can be seen from FIG. 1, a U is essentially milled out of the disc, with holding bars 12 holding the U to the remaining disc.

Milling out was done by rough-milling, so that this could rapidly be completed, for example within 30 minutes.

The U will subsequently be used as the dental arch 14 and has a size that is already adapted to the patient who is to wear the prosthesis later.

A corresponding U for a mandibular prosthesis base is milled out of another gingival blank. This was also done by rough milling, in 15 to 40 minutes, especially in 30 minutes.

The prosthesis base also comprises a holding bars that attaches it to the remaining blank disc.

Milling out is done such that an arch cavity is initially prepared, i.e. pre-milling is carried out by rough-milling. Both parts, i.e. both the tooth-colored tooth arch blank disc and the gum-colored prosthesis base blank disc, now each carry a semi-finished product that is rough-milled and attached to the remaining disc by holding bars 12.

In this state, both parts are simply milled, but only in the area where they are intended to be joined together. For the dental arch, the basal area is 18 (see FIG. 4), and for the prosthesis base, this is the tooth cavity, which herein may also be referred to as the dental arch cavity. Finish-milling is performed so that the basal surface of the dental arch is brought to the final dimension. Furthermore, in the example embodiment shown, an adhesive gap of 150 μm is left.

Following completion, the dental arch is separated from the dental arch disc by removing the holding bars 12. It is provided with adhesive in the basal area, or the tooth cavity of the prosthesis base is provided with adhesive. The dental arch is then pressed into the tooth cavity with its basal area, displacing the adhesive, and held in a specific position in which the adhesive is to cure.

Following curing, rough-milling is performed, which also in particular generously removes residual adhesive.

In the next step, the bonded combination of dental arch and prosthesis base is finished by milling. After completion, the holding bars of the prosthesis base are also removed and neating is performed.

If required, it is also possible to add a polishing step, if necessary.

Figure 2:
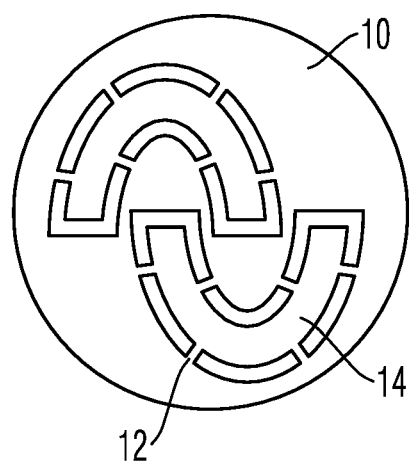
FIG. 2 is a blank for two dental arches which—apart from the holding bars—have already been rough-milled.

FIG. 2 shows how two tooth arches 14 can be accommodated in a blank disc 10.

In the example embodiment shown, they are offset to each other and are also accommodated on the disc to save space.

Figure 3:
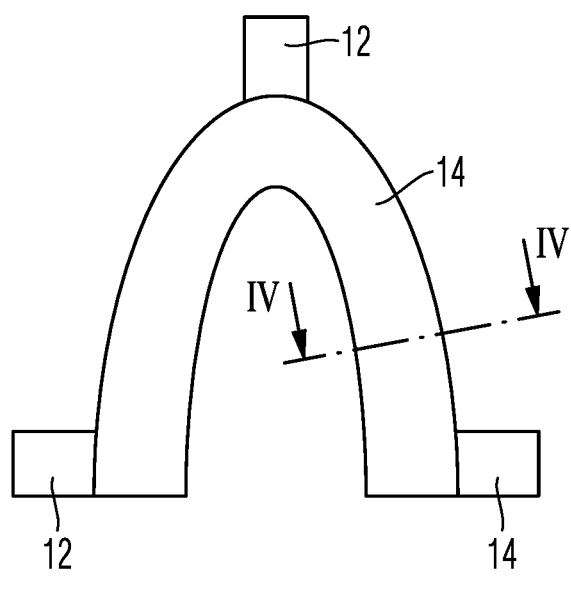
FIG. 3 is top view of a tooth arch or preformed tooth arch blank released from the blank disc, wherein the holding bars are still present or are to be provided.

In another embodiment, FIG. 3 shows how a dental arch 14 can be equipped with holding bars 12.

Figure 4:
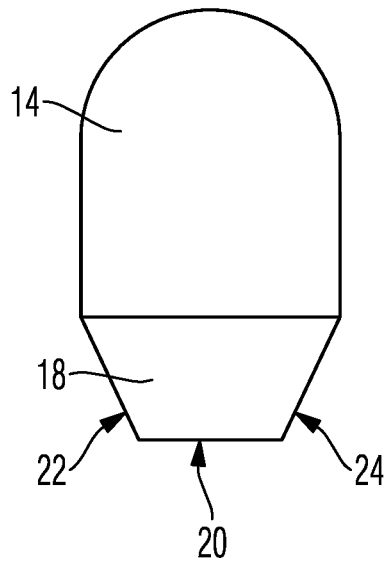
FIG. 4 is a section through the dental arch along the line IV-IV.

FIG. 4 schematically shows a section through the dental arch 14 according to line IV-IV. An incisal or occlusal area 16 is rounded, and is circularly rounded in the example shown. Herein, any embodiment is conceivable, such as curved surfaces indicating fissures.

In contrast, the basal area 18 essentially has a trapezoidal shape. The basal surface 20 is flat, and basal lateral surfaces 22 and 24 extend sideways away therefrom, diverging away from each other towards the incisal area, into which they constantly merge at their ends.

The shape shown is for the canine or premolar region. In contrast, the basal area is wider and flatter in the molar area and narrower and higher in the anterior area.

This also applies to the corresponding incisal area of the dental arch 14, even if this is not shown in this embodiment in FIG. 3.

At the transition between the basal surface 20 and the basal side surfaces 22 and 24, preferably a small radius is provided, such as 0.8 mm.

Figure 5:
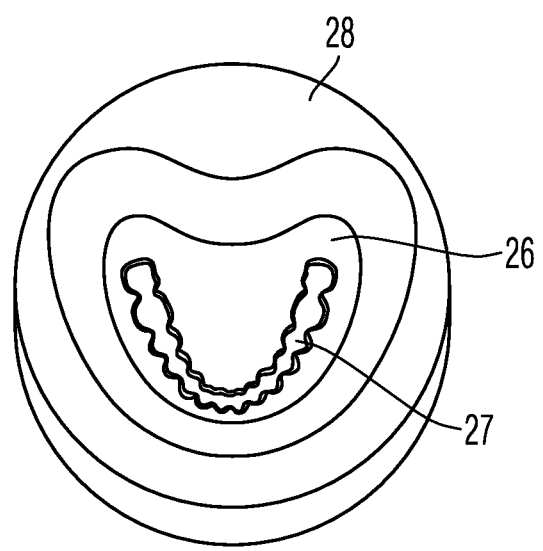
FIG. 5 is a schematic view of a semi-finished prosthesis base.

A top view of a semi-finished prosthesis base can be seen from FIG. 5. In this state, the prosthesis base 26 already has a U-shaped recess 27, which is for the subsequent accommodation of the basal area 18, i.e. the basal surface 20 and the adjacent surfaces 22 to 24, of the likewise U-shaped dental arch 14.

In this state, the prosthesis base has not yet been removed from the blank disc 28, but this is done in the next step.

The majority of the prosthesis base 26 is initially rough-milled and the U-shaped recess 27 is already finish-milled.

Figure 6A:
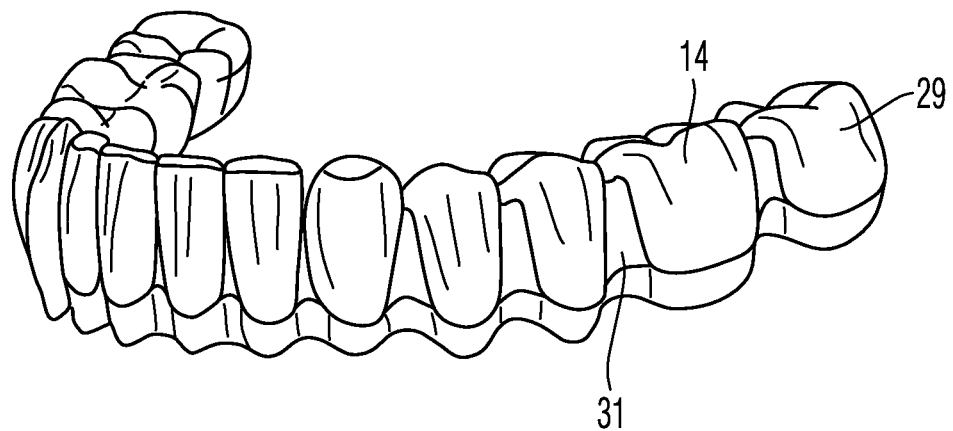
FIGS. 6*a* and 6*b* are roughened dental arches comprising a basal side to be finish-milled, in frontal and bottom views.

FIG. 6*a* shows an already rough-milled dental arch 14. The dental arch 14 already shows individual teeth 29. The teeth 29 are each attached to the tooth transitions 31. In this respect, the dental arch 14 is a monobloc including molars, premolars, canines and anterior teeth in the example embodiment shown.

It is to be understood that, according to the invention, a partial tooth arch can also be used instead.

Figure 6B:
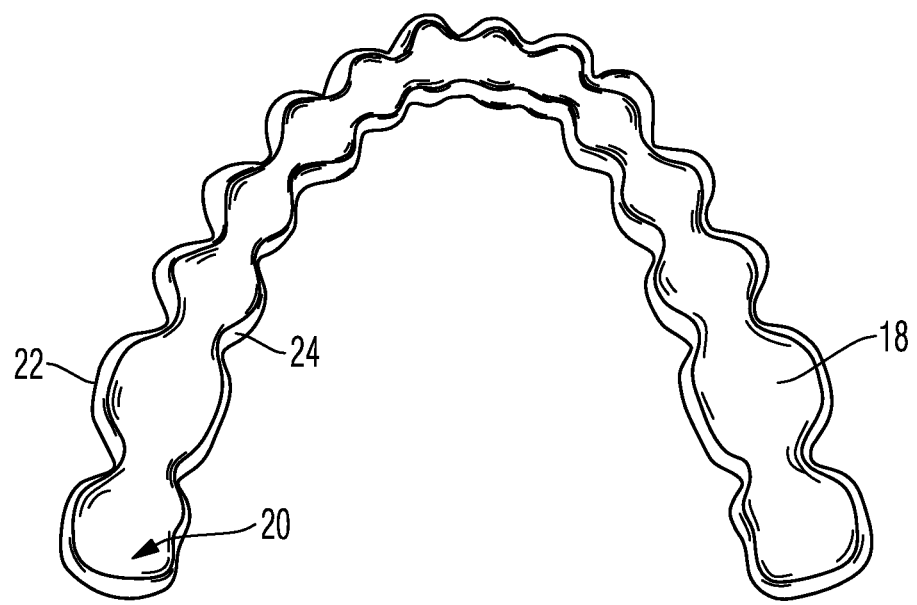

In the basal area 18, the tooth arch 14, in the state shown, is also rough-milled, as can also be seen in FIG. 6*b*. It may be seen that the basal area 18 is realized as still being rather crowned and having corresponding oversize, while in the next step, the oversize is removed by finish-milling.

Upon completion of finish-milling, the basal area 18 fits exactly into the U-shaped recess 27, leaving the adhesive joints as they are.

Figure 7:
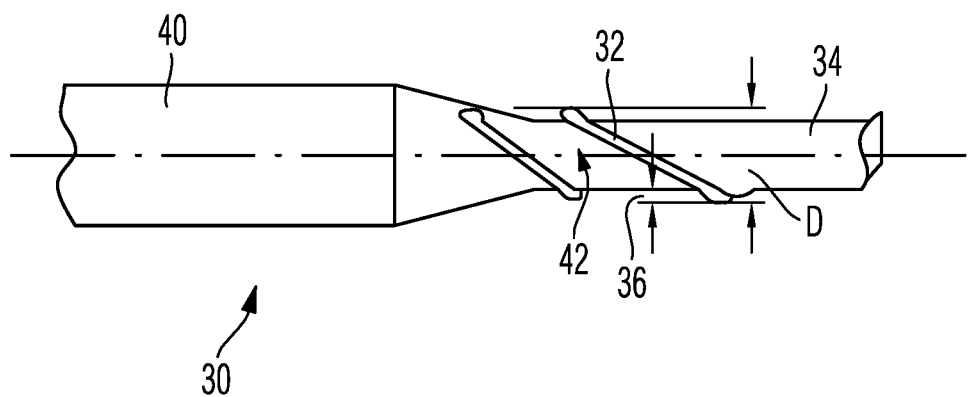
FIG. 7 is a view of an exemplary roughing cutter.

FIG. 7 shows a side view of an exemplary roughing cutter 30. The roughing cutter 30 is designed as a single cutter and is diamond coated. In a manner known per se, it has a back bar 32, which protrudes by a bar height of 36 compared to the milling cutter 34.

The bar height 36 depends on the diameter of the milling cutter. Herein, diameter is not to be understood as the diameter at the clamping shank 40, but in the front area. The diameter D of the roughing cutter can be about 1 mm to 6 mm. The bar height 36 is one twentieth to one sixth of diameter D.

The roughing cutter is designed as a single cutter having a helical circumferential groove 42 which is for discharging the milling chips.

According to the invention, single cutters are preferred, as they have the lowest tendency to clog.

It is to be understood that, other roughing cutters may suitably be used instead, for example uncoated cutters or dual cutters or, if necessary ball milling cutters may also be used.

However, coated roughing cutters are preferred at least for milling the tooth arches.

A finishing cutter to be used in accordance with the invention can have essentially the same structure, wherein both the diameter D and the bar height 36 are preferably smaller for the finishing cutter in order to take account of the smaller plunging depth in the finish-milling step.

Milling is preferably carried out in a master/slave process: First, the optimum joint between the prosthesis base and the dental arch-including the adhesive gap—is calculated using CAD.

However, the minimum material thickness of the prosthesis base is used as the master: If, based on the initial draft, this falls below a specified minimum value at a point, for example 1 mm, 1.5 mm or 2 mm, the parting line is changed so that the minimum value is observed everywhere. This can also be done, for example, by changing steepness of the basal surface of the dental arch or, if necessary, by translational movement in the vestibular direction, especially in the area of the incisors including their already greater basal surface steepness.

This process has a positive effect on the strength of the prosthesis base, while still providing optimized adhesive surfaces.

The invention claimed is:

1. A method for producing a prosthesis or partial prosthesis based on digital data, having a plurality of teeth in a dental arch and a prosthesis base comprising
    rough-milling the prosthesis base with a first milling tool, to a semi-finished prosthesis base,
    finish-milling the semi-finished prosthesis base with a second milling tool in regions of the prosthesis base, on which the teeth and the prosthesis base abut against one another and/or are to be bonded to one another,
    wherein the semi-finished prosthesis base is milled to a target height in the finish-milling step, which target height corresponds to the abutment between the prosthesis base and the teeth or dental arch plus the desired bonding gap between the prosthesis base and the teeth or dental arch.

2. The method according to claim 1, comprising
    rough-milling the dental arch from a tooth-colored blank, and
    finish-milling a basal surface of the teeth of the dental arch and any gingival regions of the dental arch adjacent to the basal surface of the teeth.

3. The method according to claim 2, comprising
    gluing the dental arch with adhesive into dental cavities of the prosthesis base,
    curing the adhesive to connect the dental arch and prosthesis base, and
    finish-milling at locations where only rough-milled areas exist.

4. The method according to claim 2, comprising
    using a roughing cutter during rough-milling of the prosthesis base having a cutting depth between 0.7 mm and 2.5 mm or between 1.0 mm and 2.0 mm,
    using a finish-milling tool during finish-milling of the prosthesis base having a cutting depth between 0.1 mm and 0.5 mm,
    using a roughing cutter during rough-milling of the dental arch or partial dental arch having a cutting depth of between 0.6 mm and 2.2 mm, and/or
    using a finish-milling tool when finishing the dental arch or partial dental arch having a cutting depth between 0.1 mm and 0.4 mm.

5. The method according to claim 3, comprising
    providing an adhesive joint between the dental arch or partial dental arch and the prosthesis base having a thickness of between 0.08 mm and 0.22 mm, and
    using a relative position of the partial dental arch or dental arch in the cavities of the prosthesis base for height/side/angle correction of the connected dental or partial dental arch and prosthesis base.

6. The method according to claim 3, comprising
    following application of the adhesive and following bonding of the dental arch into the cavities of the prosthesis base and curing of the adhesive between the dental arch and the prosthesis base, finish-milling the dental arch in a workpiece holder of the milling machine while exclusively clamping the prosthesis base.

7. The method according to claim 3, comprising
    adapting a basal geometry of the dental arch to associated shapes of the cavities of the prosthesis base, or
    adapting the associated shapes of the cavities of the prosthesis base to the basal geometry of the dental arch, and,
    wherein the geometry and associated shapes are flatter and wider in the molar region and narrower and deeper in the incisor region.

8. The method according to claim 3,
    wherein the gingival regions of the dental arch are trapezoidally milled, forming preformed contact surfaces opposite the cavities in the prosthesis base.

9. The method according to claim 1,
    comprising
    fabricating the dental arch for producing the prosthesis from a material comprising plastic having a hardness/strength which is greater than a hardness/strength of the prosthesis base material, and
    wherein the material further comprises fillers.

10. The method according to claim 9, comprising
    fabricating the dental arch from a plastic material and polymethyl methacrylate (PMMA) bead polymer fillers and/or highly crosslinked prepolymer fillers which are surrounded by a diffusion layer.

11. The method according to claim 9, comprising
    fabricating the dental arch from a plastic material and PMMA bead polymer fillers and/or highly crosslinked prepolymer fillers which are surrounded by a diffusion layer,
    wherein the fillers are present in the plastic material in an amount of greater than 0 to up to 20 wt. % of the total weight of the plastic material and fillers.

12. A method for producing a prosthesis based on digital data comprising
    producing a substantially U-shaped dental arch for subsequently holding teeth from a tooth-colored material in the form of a blank,
    leaving behind holding bars between the U-shaped dental arch and the blank as a semi-finished product,
    rough-milling teeth in the U-shaped dental arch wherein the teeth have an oversize in relation to a size of the desired teeth of the prosthesis,
    fine-milling a basal region in the dental arch having a basal surface and surfaces adjoining the basal surface for being received in a prosthesis base, and
    gluing or fastening the dental arch into the prosthesis base.

13. The method according to claim 1 comprising,
rough-milling the prosthesis base comprising milling a flat cylindrical disc of prosthesis base material into an outer contour that is substantially U-shaped.

14. The method according to claim 1, comprising
using roughing cutters having tools with diameters between 0.8 mm and 6 mm, and
using finishing cutters having tools with diameters between 0.5 mm and 3 mm or equal to or less than 2.5 mm.

15. The method according to claim 1, comprising
leaving holding bars on the dental arch during rough-milling from a blank disc,
wherein the dental arch produced by rough-milling comprises a rounded cross-section in an incisal area of the dental arch, and a basal surface and side surfaces converging towards said basal surface in a gingival area of the dental arch, and
wherein the dental arch is essentially U-shaped.

16. The method according to claim 1, comprising
prefabricating dental arches having substantially a U-shape in multiple sizes, and
selecting the size of the dental arch most suitable for the prosthesis to be manufactured,
wherein the prefabricated dental arches are prefabricated by milling or pressing processes.

17. The method according to claim 16, comprising
prefabricating dental arches in at least 3 sizes.

18. The method for producing a prosthesis according to claim 12,
producing the substantially U-shaped dental arch from a tooth-colored material blank fabricated of PMMA with fillers.

19. The method for producing a prosthesis according to claim 12, comprising
finish-milling the glued or fastened prosthesis base and dental arch.

* * * * *